United States Patent [19]  [11] 4,417,482
Witt  [45] Nov. 29, 1983

[54] DIAPHRAGM MOUNTED GEAR DRIVE DETUNER

[75] Inventor: Ronald A. Witt, Milwaukee, Wis.

[73] Assignee: The Falk Corporation, Milwaukee, Wis.

[21] Appl. No.: 346,741

[22] Filed: Feb. 8, 1982

[51] Int. Cl.³ .................... F16H 55/18; F16H 55/00; F16H 55/14
[52] U.S. Cl. ........................................ 74/409; 74/410; 74/411; 74/440; 74/443
[58] Field of Search ................ 74/409, 410, 440, 443, 74/411, 449

[56] References Cited

U.S. PATENT DOCUMENTS

| | | | |
|---|---|---|---|
| 1,604,105 | 10/1926 | Starkey | 74/440 |
| 1,678,582 | 7/1928 | Allen | 74/410 |
| 2,868,119 | 1/1959 | Buttner | 74/440 |
| 2,896,466 | 7/1959 | Wiseman | 74/409 |
| 3,037,396 | 6/1962 | Martin | 74/409 |
| 3,361,002 | 1/1968 | Staehlin | 74/440 |
| 3,405,580 | 10/1968 | Hallden | 74/409 |
| 3,545,296 | 12/1970 | Eggins | 74/409 |
| 3,636,789 | 1/1972 | Geiger | 74/409 |
| 3,682,015 | 8/1972 | Richardson | 74/377 |
| 3,803,935 | 4/1974 | Nozawa | 74/409 |
| 3,803,936 | 4/1974 | Kroeper | 74/409 |
| 4,036,074 | 7/1977 | Bodnar | 74/409 |
| 4,072,064 | 2/1978 | Lloyd et al. | 74/409 |
| 4,196,046 | 4/1980 | McConnel | 74/409 |
| 4,331,040 | 5/1982 | Swasey | 74/409 |

Primary Examiner—Lawrence J. Staab
Assistant Examiner—Michael D. Bednarek
Attorney, Agent, or Firm—Quarles & Brady

[57] ABSTRACT

A marine drive is shown in which a reverse pinion, which is in continuous mesh with a bull gear, is provided with a detuner to prevent vibration while it idles. The detuner includes a ring gear detuner pinion disposed about the reverse pinion shaft. The detuner pinion has helical teeth as do the reverse pinion and bull gear. One end of the detuner pinion is slidably mounted on a ring which encircles the reverse pinion shaft adjacent the reverse pinion, and the other end of the detuner pinion is supported by a diaphragm assembly which prevents torsional and radial motion but permits axial movement of the detuner pinion. The diaphragm assembly is mounted on a sleeve which is secured to the pinion shaft and extends through, but out of contact with, the detuner pinion.

6 Claims, 4 Drawing Figures

DIAPHRAGM MOUNTED GEAR DRIVE DETUNER

BACKGROUND OF THE INVENTION

The present invention relates to gear drives, and particularly to a diaphragm mounted detuner for preventing clatter or vibration of an idling pinion engaged with a driven gear.

In a variety of gear drives, of which marine drives are one example, there are two sets of gears that are used to transmit power from the motor or engine to the driven element, such as the propeller shaft. In a marine drive there is an ahead gear train that will drive the ship in a forward direction and a reverse gear train that will drive the ship backwards. Each of the gear trains typically includes a pinion mating with a common bull gear that in turn drives the ship's propeller. The ahead pinion and the reverse pinion are selectively engaged with the engine by a system of clutches.

The majority of time a marine drive is connected for the forward mode of operation with the ahead pinion driving the bull gear. During this time the reverse pinion continues to be in mesh with the bull gear but it is not transmitting power and is simply idling. Since the means of propulsion is usually a diesel engine and the driven member is a propeller, there are torsional impulses present in the drive train. As a result, the elements of the drive are not moved with a constant rotational velocity. When the reverse pinion is idling in mesh with the bull gear, it is subjected to the torsional impulses which it picks up from the bull gear and this often causes the reverse pinion to clatter because of the tooth clearance (backlash) in the meshing teeth of the reverse pinion and bull gear. Noises and tooth loads can be produced which are objectionable.

One approach to detuning the resulting vibrations is illustrated in U.S. Pat. No. 3,682,015 issued Aug. 8, 1972 to William S. Richardson. That approach involves forming a helical tooth pinion with a major tooth portion which can transmit the load to the bull gear under power and a minor tooth portion mounted at one end of the major tooth portion by a torsionally resilient means such as a coil spring or a rubber key. The teeth of the minor tooth portion are thicker than the teeth of the major tooth portion so that when the pinion is idling the teeth of the minor tooth portion will contact the teeth of the bull gear and hold the teeth of the major tooth portion out of engagement with the bull gear. The torsionally resilient means are selected to have sufficient stiffness so that the major tooth portion will not contact the teeth of the bull gear unless the pinion is powered to drive the bull gear. The vibrations are taken up within the torsionally resilient elements.

A second approach is illustrated and described in my copending application Ser. No. 199,087 filed Oct. 20, 1980 for "Gear Drive Detuner." This approach also employs a helical tooth pinion having a major tooth portion and a minor tooth portion but the thickness of the teeth is the same. The minor tooth portion is formed on a detuner pinion which is slidably mounted adjacent the end of the reverse pinion and is biased towards the reverse pinion so that the teeth of the detuner pinion and of the reverse pinion will be wedged in the tooth spaces of the helical bull gear when the pinion is idling. In addition to overcoming vibrations, this approach also accommodates variations in the physical size of the driving components such as bull gear run-out, dimensional changes due to thermal growth, and variation in size due to wear. One drawback to this approach is that friction must be overcome in order to allow the detuner pinion to move axially to accommodate the dimensional changes while continuing to tend to wedge its teeth and the teeth of the reverse pinion in the tooth spaces of the driven gear.

In the present invention I have developed an assembly which mounts the detuner pinion in such a way as to substantially reduce the frictional forces which it will encounter in accommodating itself to dimensional variations.

SUMMARY OF THE INVENTION

In accordance with my invention, I provide a detuner pinion which is sslidably mounted on a ring over only a minor portion adjacent one of its ends and which has its other end supported by a diaphragm assembly which provides torsional and radial stiffness but is axially flexible so as to permit the detuner pinion to move axially.

In particular, I provide a detuner for a gear drive which has a helical driven gear and a helical pinion which can idle in mesh with the driven gear, and in which the detuner includes a detuner pinion having helical teeth in mesh with the driven gear and disposed at one end of the teeth of the helical pinion, a ring coaxial with the helical pinion and supporting the end of the detuner pinion adjacent the helical pinion, and a diaphragm assembly including two thin wall diaphragm discs mounted transverse to the axis of the helical pinion and joined together adjacent their outer perimeters, one of the discs being operatively connected to the helical pinion and the other disc being connected to the other end of the detuner pinion so as to support that end.

It is a principal object of the invention to provide a detuner for a gear drive which can dampen vibrations in an idling gear and adjust for dimensional vibrations in the components.

It is another object of the invention to provide such a detuner which is free to shift axially with respect to the idling pinion being dampened and which will encounter only small frictional forces when it moves axially.

The foregoing and other objects and advantages of the invention will appear in the following detailed description. In the description reference is made to the accompanying drawings which illustrate a preferred embodiment of the invention.

DETAILED DESCRIPTION OF THE PREFERRED EMBODIMENT

Figure 1:
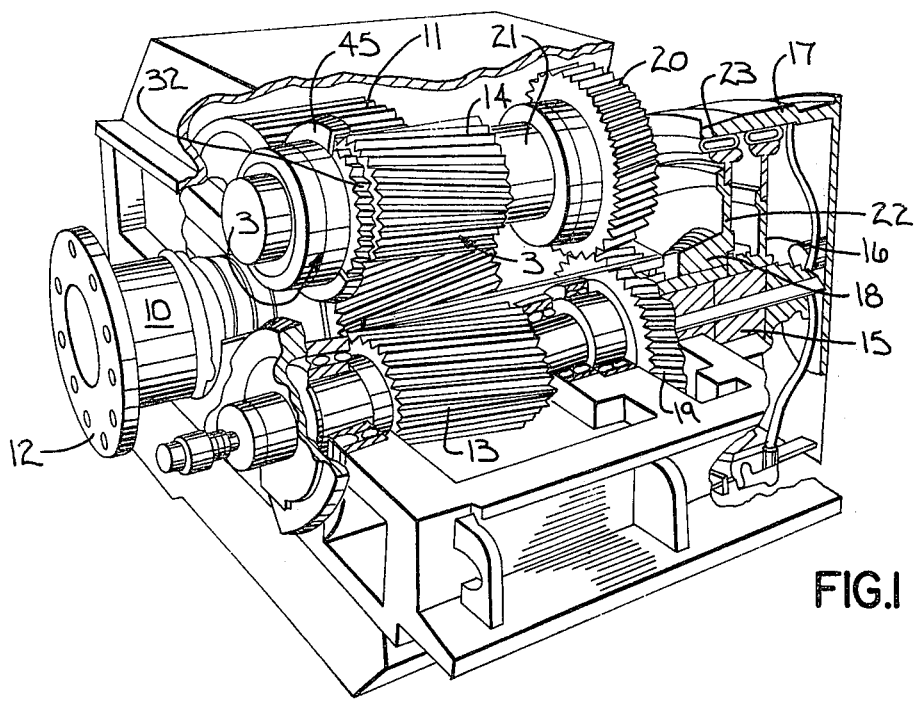
FIG. 1 is a view in perspective and partially in section of a gear drive with which the present invention may be used.

In FIG. 1 there is illustrated a marine drive in which the present invention can be used. The marine drive is of known construction and operation. Generally, it includes an output shaft 10 which mounts a main or bull gear 11 having a flange 12 adapted to be connected to a coupling or to another flange which in turn connects directly to the propeller shaft. The bull gear 11 is driven alternately by a forward pinion 13 and a reverse pinion 14, both of which are at all times in mesh with the bull gear 11. All of the gearing has helical teeth.

The ahead or forward pinion 13 is mounted on an ahead pinion shaft 15 which mounts an ahead clutch drum 16. The drum 16 is adapted to be operatively connected to an ahead clutch 17 driven by the prime mover which is usually a diesel engine. The ahead clutch 17 includes an air actuated flexible gland which, when inflated, will engage and drive the ahead drum 16. Surrounding the forward pinion shaft 15 is a hollow reverse input gear shaft 18 with a gear 19 journaled in the housing. The gear 19 meshes with a reverse idler gear 20 mounted on a reverse pinion shaft 21 which also mounts the reverse pinion 14. The reverse input gear shaft 18 also mounts a reverse clutch drum 22 which is adapted to be operatively engaged by an air expandable flexible gland mounted on a reverse clutch 23.

In operation, the clutches 17 and 23 are connected to and driven continuously by the engine. Air is supplied selectively to either the ahead or reverse clutch 17 or 23, as desired. For ahead rotation, the ahead clutch 17 is actuated and it frictionally engages the ahead clutch drum 16 thereby driving the forward pinion shaft 15 and providing direct single reduction drive through the forward pinion 13 and the bull gear 11 to the propeller shaft. While this is occurring, the reverse train of gears with the reverse clutch 23 disengaged will idle with the reverse pinion 14 freely driven by the bull gear 11.

For astern rotation, the ahead clutch 17 is released and the reverse clutch 23 is engaged so that the reverse drum 22 mounted on the reverse input shaft 18 is driven. This drives the reverse input gear 19 and the reverse idler gear 20 and thereby drives the reverse pinion 14 rotating the bull gear 11 in the opposite direction.

When such a gear drive is not provided with a detuner mechanism, the idling reverse pinion 14, is subjected to torsional impulses and clatters as its teeth osculate through the backlash with the teeth of the bull gear 11. This can lead to undesirable noise and potentially damaging impact loading on the teeth. The present invention eliminates this condition.

Figure 2:
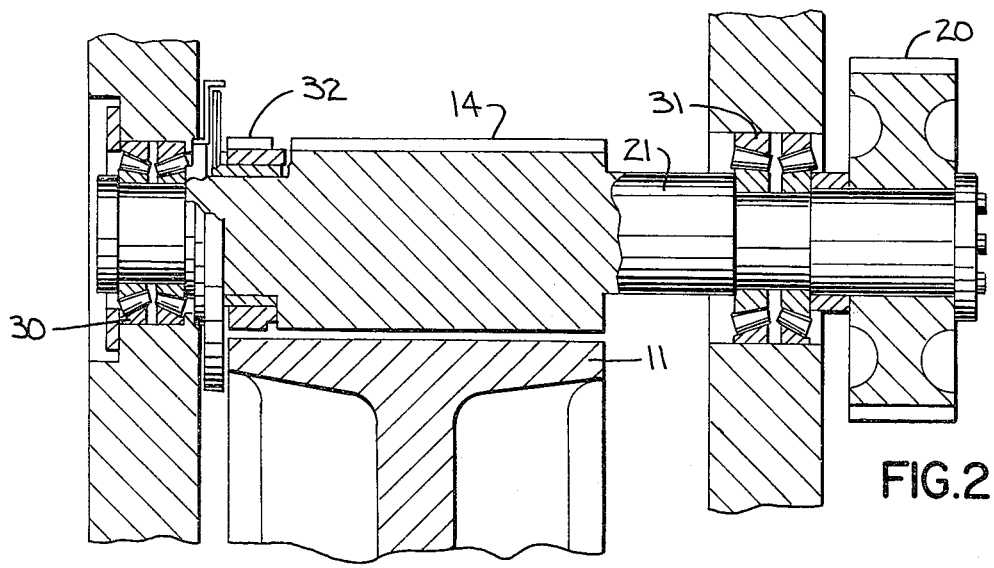
FIG. 2 is a view in section taken along the longitudinal axis of the reverse pinion shaft of the gear drive in FIG. 1.
Figure 3:
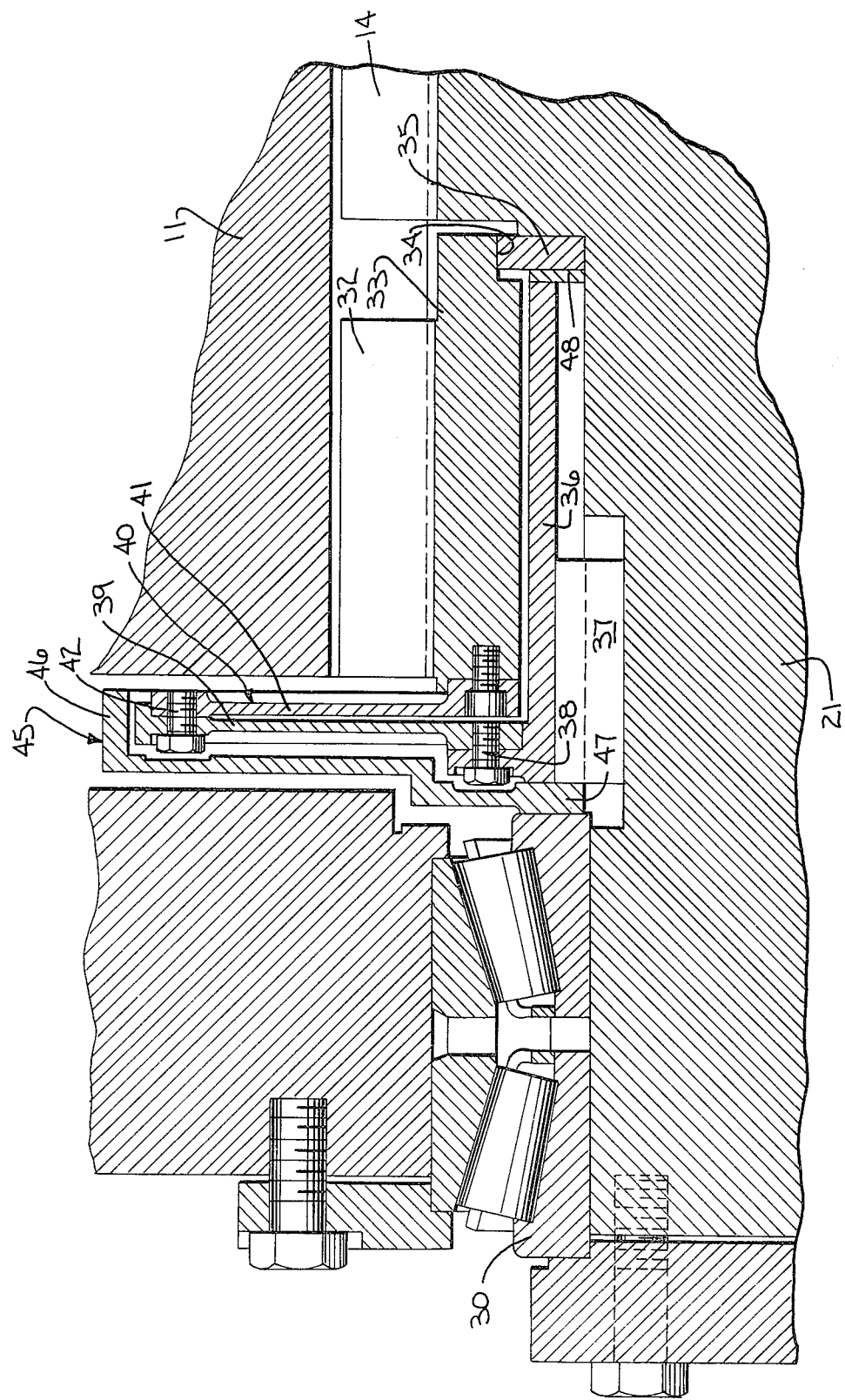
FIG. 3 is an enlarged view in section of the detuner taken in the plane of the line 3—3 of FIG. 1.

In FIG. 2, the reverse pinion shaft 21 is illustrated to a slightly enlarged scale. The pinion shaft 21 is shown mounted in a pair of double row roller bearings 30 and 31 which in turn are mounted in side plates of the housing. The reverse pinion 14 is illustrated as being formed integral with the pinion shaft 21. However, it could instead be keyed or otherwise rigidly affixed to the shaft 21. A detuner pinion 32 in the form of a helical tooth ring gear is disposed adjacent one end of the teeth of the reverse pinion 14. Referring to FIG. 3, one end of the detuner pinion 32 is formed with an extending hub portion 33 having a counterbore 34 which seats upon the outer periphery of a brass ring 35. The brass ring 35 is disposed about the perimeter of the pinion shaft 21 and abuts against the end of the reverse pinion 14. The counterbore 34 is of a length greater than the thickness of the ring 35 so that the detuner pinion 32 has clearance to move axially with respect to the ring 35.

A sleeve 36 extends along the pinion shaft 21 in a direction away from the brass ring 35 and the reverse pinion 14 and inside the detuner pinion 32. The sleeve 36 is attached to the shaft 21 by a key 37. The outer diameter of the sleeve 36 is less than the inner diameter of the detuner pinion 32 so that a clearance is provided between the two. The end of the sleeve 36 remote from the reverse pinion 14 is provided with an annular flange 38 which mounts one disc 39 of a diaphragm assembly 40. The diaphragm assembly 40 includes a second disc 41 which is secured adjacent its inner periphery on the end of the detuner pinion 32 which is opposite the reverse pinion 14. The discs 39 and 41 are joined together adjacent their outer periphery by a series of bolts 42. A shroud 45 extends along one side of the diaphragm assembly 40 and has a protective overlying flange 46. The radially inner rim 47 of the shroud 45 acts as a spacer between the end of the sleeve 36 and the bearing 30.

Figure 4:
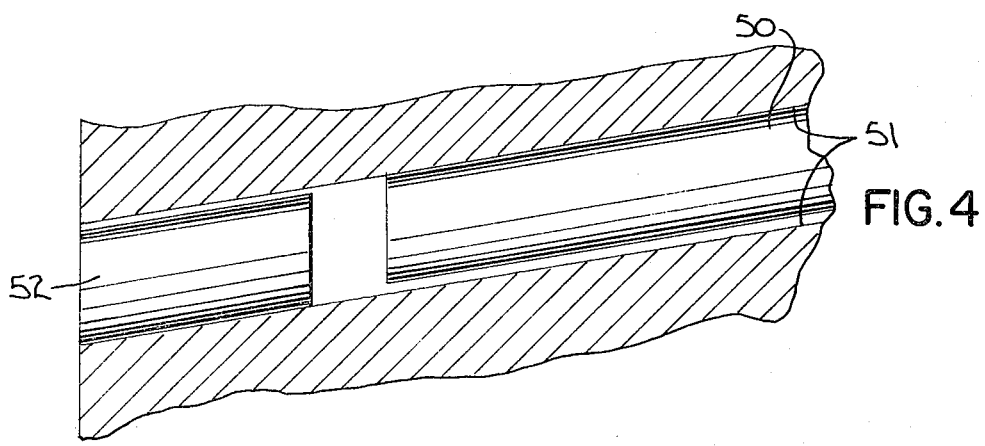
FIG. 4 is a generally schematic view showing the relative relationships of the teeth of the detuner pinion, of the reverse pinion, and of the bull gear when the pinion is idling.

When properly positioned during idling, the teeth 50 of the reverse pinion 14 will contact one side of the tooth space 51 in the bull gear 11 and the teeth 52 of the detuner pinion 32 ill contact the other side of the tooth space and thereby wedge between the teeth of the bull gear 11 (see FIG. 4). By this wedging action, the reverse pinion assembly with the detuner pinion 32 is held in meshing engagement with the bull gear 11 without any backlash. The position of the detuner pinion 32 for idling is achieved by adjusting the axial position of the detuner pinion 32 relative to the reverse pinion 14 while the gear drive is at rest. This is accomplished by shims 48 inserted between the brass ring 35 and the end of the sleeve 36 to adjust the preload position of the anchor point of the diaphragm assembly 40 to the sleeve 36.

The discs 39 and 41 of the diaphragm assembly 40 are formed of thin wall metal which will permit flexing in the axial direction but which are stiff enough to prevent torsional motion or radial motion. Thus, the detuner pinion 32 is not free to move radially but is free to move axially in response to changing conditions including changing dimensions of the teeth of the reverse pinion or of the detuner pinion, or changes in the space width between the teeth of the bull gear.

The diaphragm assembly 40 holds the detuner pinion 32 free of the sleeve 36. As a result, the only sliding contact which the detuner pinion 32 has with other elements is with the brass ring 35, and the sliding contact at the pitch line of the meshing gearing. The resulting friction force created at the contact with the brass ring is only a fraction of the load imposed on the teeth of the detuner pinion 32. In contrast, the friction forces which must be overcome in my copending application Ser. No. 199,087 are a multiple of the load on the sides of the detuner pinion teeth.

Although the invention has been illustrated as incorporated into a marine drive, it will be apparent that the detuner can be advantageously used whenever one gear will continuously mesh and idle with another gear. This situation will most often occur in reversing gear drives where one direction of output rotation will typically predominate. The dominant direction of rotation is considered to be the forward direction regardless of the direction of motion which the dominant rotation produces. Under such a system of nomenclature, the reverse pinion will be the gear to which the detuner is attached since it will idle most of the time during operation of the gear drive. In some cases it may be desirable to provide a detuner mechanism on both pinions.

I claim:

1. A detuner for a gear drive including a helical driven gear and a helical pinion which idles in mesh with the driven gear, comprising:
- a detuner pinion having helical teeth in mesh with the driven gear and disposed at one end of said helical pinion;
- a ring coaxial with said helical pinion and supporting the end of said detuner pinion adjacent said helical pinion; and
- a diaphragm assembly including two thin wall diaphragm discs disposed transverse to the axis of the helical pinion and being joined together adjacent their outer perimeters, one of said discs being operatively connected to said helical pinion and the other disc being connected to the other end of said detuner pinion to support such other end.

2. A detuner in accordance with claim 1 wherein said detuner pinion is a ring gear disposed about the shaft of said helical gear, said ring is mounted on said shaft, and said one of said discs is mounted on sleeve surrounding said shaft and restrained axially and circumferentially with respect to said shaft, the inner periphery of said detuner pinion being spaced from the outer periphery of said sleeve.

3. A detuner in accordance with claim 2 wherein, when the gears are at rest, said sleeve is disposed axially upon said shaft in a position in which the diaphragm assembly holds the teeth of the detuner pinion against sides of the tooth spaces of the driven gear opposite the sides of the tooth spaces contacted by the teeth of said helical gear.

4. A detuner for a helical pinion which is adapted to mate with a helical gear, comprising:
- a detuner pinion disposed adjacent the helical pinion and having helical teeth adapted to engage with the helical gear;
- means slidably mounting the end of said detuner pinion adjacent the helical pinion; and
- a diaphragm assembly mounting the other end of said detuner pinion, said diaphragm assembly having torsional and radial stiffness and being flexible in the axial direction.

5. A detuner in accordance with claim 4 wherein said diaphragm assembly includes a pair of thin discs disposed transverse to the axis of said helical pinion and joined together adjacent their outer peripheries, one of said discs being supported with said helical pinion and the other disc supporting said detuner pinion.

6. In a reversing gear drive including a helical driven gear and forward and reverse helical pinions in mesh with said driven gear and alternately connectable to a prime mover, the combination therewith of:
- a ring disposed about the shaft mounting said reverse pinion and adjacent to said reverse pinion;
- a sleeve encircling said shaft and extending away from said ring, said sleeve being axially and circumferentially restrained on said shaft;
- a ring gear detuner pinion disposed about and spaced from said sleeve, one end of said detuner pinion being mounted on said ring; and
- a diaphragm assembly including two radially disposed diaphragm discs joined together adjacent their outer perimeter, a first of said discs being mounted on said sleeve and the second of said discs being secured to the opposite end of said detuner pinion.

* * * * *